US008719590B1

(12) United States Patent
Faibish et al.

(10) Patent No.: US 8,719,590 B1
(45) Date of Patent: May 6, 2014

(54) SECURE PROCESSING IN MULTI-TENANT CLOUD INFRASTRUCTURE

(75) Inventors: Sorin Faibish, Newton, MA (US); Percy Tzelnic, Concord, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/525,919

(22) Filed: Jun. 18, 2012

(51) Int. Cl.
*G06F 12/14* (2006.01)
(52) U.S. Cl.
USPC .......................................................... 713/190
(58) Field of Classification Search
CPC ................................... H04L 9/14; H04L 9/28
USPC .......................................................... 713/190
See application file for complete search history.

(56) References Cited

U.S. PATENT DOCUMENTS

| | | | | |
|---|---|---|---|---|
| 7,260,215 | B2 * | 8/2007 | Troyansky et al. | 380/28 |
| 7,266,198 | B2 * | 9/2007 | Medvinsky | 380/200 |
| 7,523,130 | B1 * | 4/2009 | Meadway et al. | 1/1 |
| 8,185,624 | B2 * | 5/2012 | Pal et al. | 709/224 |
| 2011/0238981 | A1 * | 9/2011 | Nanaumi | 713/155 |

OTHER PUBLICATIONS

M. Rosenblum et al., "Virtual Machine Monitors: Current Technology and Future Trends," IEEE Computer Society, May 2005, pp. 39-47, vol. 38, No. 5.
F. Rocha et al., "The Final Frontier: Confidentiality and Privacy in the Cloud," IEEE Computer Society, Sep. 2011, pp. 44-50, vol. 44, No. 9.
U.S. Appl. No. 13/075,848, filed in the name of A. Juels et al. Mar. 30, 2011 and entitled "Remote Verification of File Protections for Cloud Data Storage."
U.S. Appl. No. 13/432,577, filed in the name of A. Juels et al. Mar. 28, 2012 and entitled "Counter-Based Encryption of Stored Data Blocks."

* cited by examiner

*Primary Examiner* — Kambiz Zand
*Assistant Examiner* — Dant Shaifer Harriman
(74) *Attorney, Agent, or Firm* — Ryan, Mason & Lewis, LLP

(57) ABSTRACT

Cloud infrastructure of an information processing system comprises one or more processing devices implementing a plurality of virtual machines. The cloud infrastructure is configured to receive a processing job from a tenant, to obtain a first key specific to the tenant, to determine a second key utilizing information supplied by the tenant, and to encrypt one or more results of the processing job utilizing a combination of the first key and the second key. At least a portion of the second key is determined by at least one application that is run on at least one virtual machine of the cloud infrastructure in conjunction with performance of the processing job. The encrypted results of the processing job may be stored in a virtual memory of the cloud infrastructure and transmitted to the tenant.

21 Claims, 5 Drawing Sheets

SECURE PROCESSING IN MULTI-TENANT CLOUD INFRASTRUCTURE

FIELD

The field relates generally to information processing systems, and more particularly to cloud-based information processing systems.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Typical cloud service offerings include, for example, Infrastructure-as-a-Service (IaaS), Platform-as-a-Service (PaaS), and Software-as-a-Service (SaaS).

In cloud-based information processing systems, enterprises in effect become tenants of the cloud service providers. However, by relinquishing control over their information technology resources, these cloud tenants expose themselves to additional potential security threats. As one illustration, a given tenant may be inadvertently sharing physical hardware resources of a cloud computing environment with other tenants that could be competitors or attackers. Similar issues arise in other types of information processing systems in which computing environments or other types of information technology infrastructure are shared by multiple tenants.

It is therefore important that tenant files entrusted to a cloud service provider be subject to appropriate security protections. For example, the tenant may require that its files be stored in an encrypted format.

Techniques for allowing a tenant to verify that its files are subject to appropriate security protections by the cloud service provider are disclosed in U.S. patent application Ser. No. 13/075,848, filed Mar. 30, 2011 and entitled "Remote Verification of File Protections for Cloud Data Storage," which is commonly assigned herewith and incorporated by reference herein. Illustrative systems disclosed therein implement file protection verification functionality using an "hourglass" protocol that provides an efficient and accurate technique for verifying that files stored by cloud storage providers are subject to appropriate protections such as encryption. The hourglass protocol is configured to ensure that transformation of a given file from one format to another is subject to minimum resource requirements. As a result, a cloud storage provider cannot, for example, store a file in unencrypted form and then encrypt it only upon receipt of a verification request from the tenant.

Further advances are disclosed in U.S. patent application Ser. No. 13/432,577, filed Mar. 28, 2012 and entitled "Counter-Based Encryption of Stored Data Blocks," which is commonly assigned herewith and incorporated by reference herein. One or more of the illustrative disclosed arrangements provide improved security for stored data blocks, such as those that are stored for a given tenant in cloud infrastructure of a cloud service provider, by maintaining counters for the respective stored data blocks and utilizing the counter values in encrypting the data blocks. As a more particular example, enhanced security may be provided for stored tenant data through the use of homomorphic encryption based on counter values maintained for respective stored data blocks.

Despite these advances, a need remains for additional improvements in secure data processing, particularly for tenants of cloud service providers. For example, many conventional techniques assume a significant level of trust in the cloud service provider and its personnel relative to sensitive tenant data. However, certain tenants may not be comfortable in placing such trust in the cloud service provider, and as a result these conventional techniques can represent a roadblock to more widespread adoption of cloud services.

SUMMARY

Illustrative embodiments of the present invention provide improved security for tenants of multi-tenant cloud infrastructure. For example, one or more of the disclosed techniques can not only protect sensitive data of a given tenant from compromise by other tenants sharing the cloud infrastructure, but also protect sensitive tenant data from compromise by the cloud service provider itself.

In one embodiment, cloud infrastructure of an information processing system comprises one or more processing devices implementing a plurality of virtual machines. The cloud infrastructure is configured to receive a processing job from a tenant, to obtain a first key specific to the tenant, to determine a second key utilizing information supplied by the tenant, and to encrypt one or more results of the processing job utilizing a combination of the first key and the second key. At least a portion of the second key is determined by at least one application that is run on at least one virtual machine of the cloud infrastructure in conjunction with performance of the processing job. The encrypted results of the processing job may be stored in a virtual memory of the cloud infrastructure and transmitted to the tenant.

By way of example, the first key may comprise a tenant-specific key generated by a cloud service provider and provided by the cloud service provider to the tenant, and the second key may comprise a private key of the tenant that is at least partially hidden within one or more applications. As a more particular illustration, the second key may be at least partially hidden within at least one application by virus-like association of at least a portion of the second key with a binary file of that application. This application or an associated container file may be sent to the cloud service provider in an encrypted form using the first key while the corresponding execution results will be encrypted for storage or transmission utilizing both the first key and the second key.

The processing job may comprise running multiple applications on multiple virtual machines of the cloud infrastructure. The term "application" as used herein is intended to be broadly construed, and these multiple applications may comprise entirely different applications or different instances of a given application, as well as combinations of different applications and application instances.

In an arrangement in which the processing job comprises multiple applications, portions of the second key may be hidden in respective ones of the applications. A given one of the applications determines the second key by obtaining selected fragments of the second key from respective ones of the other applications and combining its own fragment of the second key with the selected fragments obtained from the respective ones of the other applications so as to thereby reconstruct the second key. Thus, for example, the selected fragments may comprise m fragments randomly selected from respective ones of the applications, where m is less than or equal to n, and where n denotes the total number of applications of the processing job running on respective virtual machines of the cloud infrastructure.

In these and other embodiments, the application may determine the second key utilizing an application plug-in that is provided by the tenant to the cloud infrastructure in encrypted form using the first key.

One or more of the illustrative embodiments described herein exhibit enhanced security relative to conventional arrangements in the processing, storage and transmission of tenant data in cloud infrastructure. The disclosed arrangements can be used to ensure that the data of a given tenant is not only safe from compromise by other tenants that could be competitors or attackers, but also safe from compromise by the cloud service provider itself, thereby increasing tenant confidence in the cloud service provider, and facilitating the more widespread adoption of cloud services by tenants.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
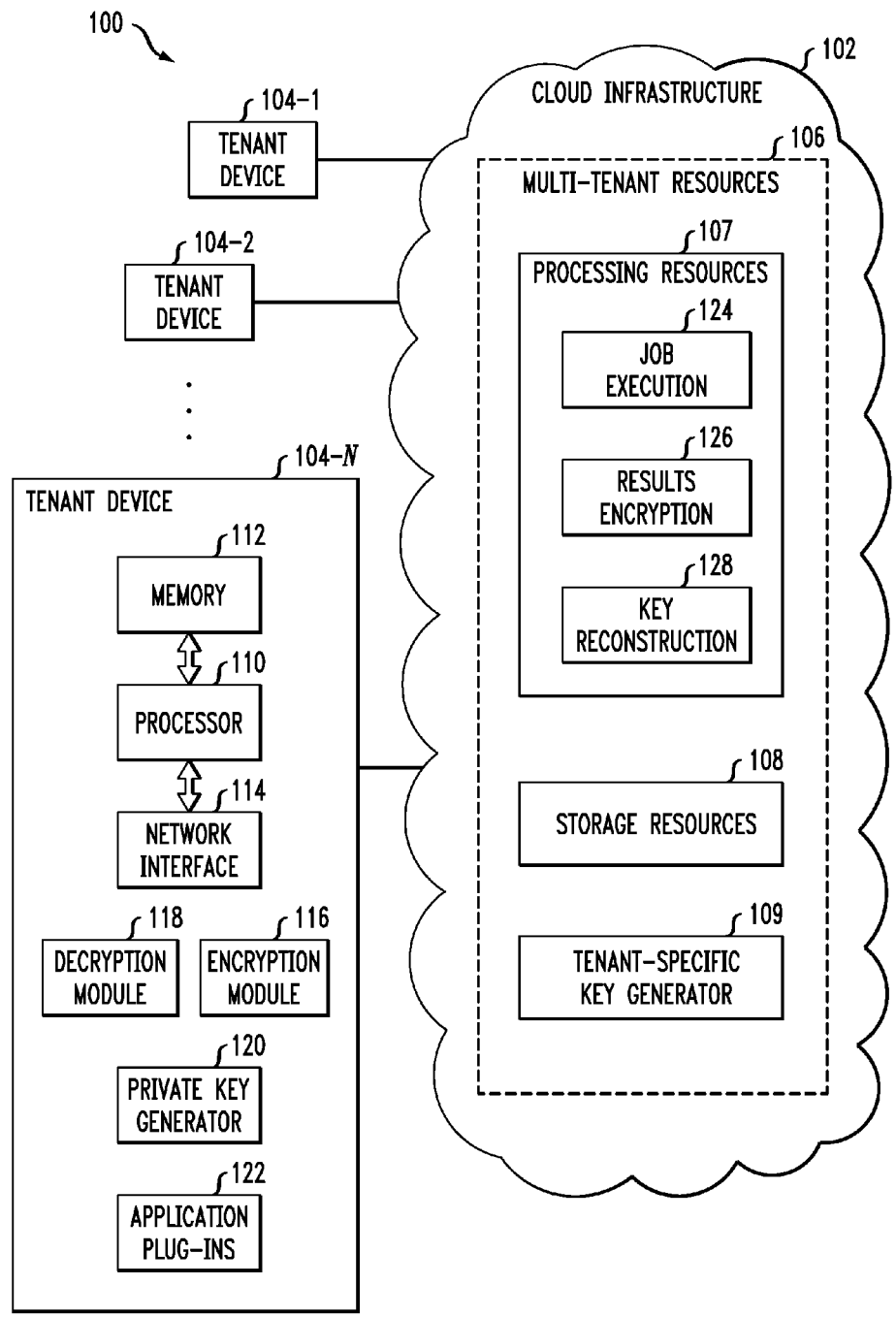
FIG. 1 is a block diagram of information processing system in an illustrative embodiment of the invention.

FIG. 1 shows an information processing system 100 configured in accordance with an illustrative embodiment of the present invention. The information processing system 100 comprises cloud infrastructure 102. Tenants associated with respective tenant devices 104-1, 104-2, . . . 104-N utilize services provided by the cloud infrastructure 102, and the tenant devices may be configured to access the cloud infrastructure via a network or other communication channel. The term "tenant" as used herein is intended to be broadly construed, and may be used to refer to a user or other entity, its associated device or both. The same reference numeral 104 will be used for all of these cases.

The cloud infrastructure 102 may comprise, for example, software products running on a processing platform of a cloud service provider, although other types of products, including hardware products or virtualized products, may additionally or alternatively be utilized by at least a subset of the tenants 104. The cloud infrastructure 102 may be viewed as comprising physical infrastructure and associated virtualization infrastructure running on the physical infrastructure.

The cloud infrastructure 102 or portions thereof may be implemented using one or more processing devices of a processing platform. Examples of processing platforms that may form portions of the cloud infrastructure 102 in system 100 will be described in more detail below in conjunction with FIGS. 3 and 4.

In the present embodiment, the cloud infrastructure 102 implements multi-tenant resources 106 that include processing resources 107 and storage resources 108. The processing resources 107 will typically comprise a plurality of virtual machines, and the storage resources 108 will typically comprise a plurality of virtual disks. Also associated with the multi-tenant resources 106 is a tenant-specific key generator 109.

The cloud infrastructure 102 provides security for individual tenants utilizing the multi-tenant resources 106. More particularly, with regard to a given one of the tenants, the cloud infrastructure 102 is configured to receive a processing job from the tenant, to provide a first key to the tenant, to determine a second key utilizing information supplied by the tenant, and to encrypt one or more results of the processing job utilizing a combination of the first key and the second key.

The first key referred to above illustratively comprises a tenant-specific key that is generated by a cloud service provider associated with cloud infrastructure 102. The tenant-specific key is generated using tenant-specific key generator 109 and provided by the cloud service provider to the tenant. In other embodiments, the tenant-specific key may be separately generated by both the tenant and the cloud service provider. For example, both of these entities may independently generate a public key specific to the tenant using a public certificate and a shared password or other shared secret.

The second key referred to above illustratively comprises a private key of the tenant. At least a portion of the second key is determined by at least one application that is run on at least one of the virtual machines of the cloud infrastructure 102 in conjunction with performance of the processing job of that tenant. As will be described in greater detail in conjunction with FIGS. 2, 5 and 6, the second key is at least partially hidden within one or more applications, illustratively by virus-like association of at least a portion of the second key with a binary file of a given one of the applications. The application determines the second key utilizing an application plug-in that is provided by the tenant to the cloud infrastructure 102 in encrypted form using the first key.

The tenant devices 104 may be implemented as respective processing devices. A given such processing device may comprise, for example, a computer, a mobile telephone or other type of communication device.

A given cloud infrastructure or tenant processing device generally comprises at least one processor and an associated memory, and includes one or more functional modules for controlling certain features of the system 100.

As noted above, the system 100 in the present embodiment implements various processes that provide enhanced security for tenants of the cloud infrastructure 102. An example of such a process performed utilizing the multi-tenant resources 106 of cloud infrastructure 102 will be described in conjunction with FIG. 2, but it is to be appreciated that numerous other types of processes may be used in other embodiments.

A given one of the tenant devices 104-N in the present embodiment more particularly comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination. The memory 112 and other memories disclosed herein may be viewed as examples of what are more generally referred to as "computer program products" storing executable computer program code.

Also included in the tenant device 104-N is network interface circuitry 114. The network interface circuitry 114 allows the tenant device 104-N to communicate over one or more networks with the cloud infrastructure 102, and possibly with the other tenant devices 104, and may comprise one or more conventional transceivers.

The tenant device 104-N further includes an encryption module 116, a decryption module 118, a private key generator 120 and a set of application plug-ins 122. One or more of the modules 116, 118, 120 and 122 may be implemented at least in part in the form of software that is stored in memory 112 and executed by processor 110.

The other tenant devices 104 of the system 100 are assumed to be configured in a manner similar to that shown for tenant device 104-N in the figure.

As mentioned above, the tenant devices 104 may access the cloud infrastructure 102 over a network, which may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The tenant devices 104 interact with the multi-tenant resources 107 of the cloud infrastructure 102, including the processing resources 107, the storage resources 108 and the tenant-specific key generator 109. The processing resources 107 of cloud infrastructure 102 further comprise a job execution module 124, a results encryption module 126 and a key reconstruction module 128. There may be separate instances of one or more of the modules 124, 126 and 128 for each of the tenants that share the multi-tenant resources 106.

It is to be appreciated that the particular set of elements shown in FIG. 1 for providing tenant security in cloud infrastructure 102 is presented by way of example, and in other embodiments additional or alternative elements may be used. Thus, another embodiment may include additional sets of tenant devices or cloud infrastructure.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

The operation of the system 100 will now be described in greater detail with reference to the flow diagram of FIG. 2, which illustrates a set of operations performed by the cloud infrastructure 102 in an illustrative embodiment.

The process as shown includes steps 200 through 212, which are assumed to be performed using elements of the cloud infrastructure such as multi-tenant resources 106, although in other embodiments one or more such steps may be implemented at least in part by other system elements. Again, the term "tenant" is intended to be broadly construed, and may refer to the tenant device or an associated entity, or may collectively refer to a combination of both the tenant device and an associated entity. Embodiments of the invention are not limited in terms of the particular tenant configuration utilized.

In step 200, the cloud infrastructure 102 receives a processing job from a given tenant, which is assumed to be associated with tenant device 104-N of FIG. 1. The term "processing job" as used herein is intended to encompass any type of functionality that may be performed in cloud infrastructure for a particular tenant, and will generally involve the execution of at least one application, which may include, for example, an application that involves processing, storing and transmitting proprietary or otherwise sensitive tenant data. Execution of the job may be controlled at least in part by job execution module 124.

It is to be understood that the term "application" as used herein is intended to be broadly construed. Accordingly, references herein to multiple applications should be understood to encompass, for example, a set of entirely different applications or a set of different instances of a given application, as well as various combinations of different applications and application instances. An application instance is therefore considered a type of application as that latter term is broadly applied herein.

The particular virtual machine or machines utilized by the one or more applications may be selected from a catalog or other list of such virtual machines so as to include no sensitive tenant data at start-up. Also, one or more corresponding virtual disks may be loaded in anticipation of job execution but again may be configured so as not include sensitive tenant data at this point in the process.

In step 202, the cloud infrastructure 102 utilizes tenant-specific key generator 109 to generate a tenant-specific key, and provides the resulting key to the tenant device 104-N. The tenant-specific key in the present embodiment may also or alternatively be job-specific, such that a new tenant-specific key is generated for each new processing job submitted by the given tenant. It may be assumed for the present embodiment that the tenant-specific key is specific to both the requesting tenant and the submitted job. As noted above, in other embodiments the tenant-specific key may comprise a public key that is separately generated by both the tenant and the cloud service provider, for example, using a public certificate and a shared password. In such an embodiment, the tenant generates its own tenant-specific key, rather than having it supplied by the cloud service provider. An embodiment of this type will be described in greater detail below in conjunction with FIG. 5.

In step 204, the cloud infrastructure 102 initiates processing of the job from the given tenant. This involves the use of at least one application that is run on at least one virtual machine of the cloud infrastructure. As the job proceeds, results are generated and those results are encrypted using a private key of the tenant so as to be protected in storage and transmission in the manner described below. This may involve use of results encryption module 126 of processing resources 107. However, it should be noted that this tenant data in the present embodiment remains unencrypted inside the operating system environment of the allocated virtual machine or machines, so as to allow the job processing to be carried out properly. It is therefore assumed in the present embodiment that a hypervisor controlling the operating system environment of the virtual machines does not leak or corrupt the tenant data, although in other embodiments this assumption need not apply.

In step 206, in conjunction with performance of the processing job, a tenant-supplied application plug-in of a given one of the applications is utilized to determine the private key of the tenant. The private key of the tenant is generated in private key generator 120. The application plug-in that is utilized to determine the private key may be one of a plurality of application plug-ins 122 controlled by the tenant device 104-N. Such application plug-ins may be transmitted from the tenant device to the cloud service provide in encrypted form using the tenant-specific key provided in step 202.

In step 208, results of the processing job are encrypted utilizing both the tenant-specific key and the private key determined by the application that includes the tenant-supplied application plug-in.

For example, the application may determine the private key by reconstructing the private key from fragments hidden in other applications that are executing as part of the job. In such an arrangement, multiple applications are running on respective virtual machines of the cloud infrastructure, and portions of the private key are hidden in respective ones of the applications. One way to hide portions of the private key in respective ones of the applications is to use a virus-like association of the portions of the private key with respective binary files of the applications. Thus, the portions of the private key are added to the binary files in a manner similar to that used by viruses, as will be appreciated by those skilled in the art. A given application or an associated container file containing a hidden portion of the private key may be sent to the cloud service provider in an encrypted form using the tenant-specific key, while the corresponding execution results will be encrypted for storage or transmission utilizing both the tenant-specific key and the private key.

Numerous other techniques may be used to conceal the location and size of the private key from other cloud entities, including other tenants and the cloud service provider itself. In this embodiment, the private key is reconstructed by a given application during the run of the job and used to encrypt the results of that job. At the end of the run, the application plug-in that was used to determine the private key may be deleted.

Any given one of the applications can determine the private key by obtaining selected fragments of the private key from respective ones of the other applications and combining its own fragment of the private key with the selected fragments obtained from the respective ones of the other applications so as to thereby reconstruct the private key. The fragments may be randomly selected. Such operations may involve use of the key reconstruction module 128 of the processing resources 107. A more detailed version of a key reconstruction process will be described below in conjunction with FIG. 6.

In step 210, the encrypted results are transmitted to the tenant. As these results are encrypted using both the tenant-specific key generated by the cloud service provider and the private key of the tenant, the results are securely transmitted back to the requesting tenant. This ensures that the results of the job execution are not visible in network traffic that can be intercepted by an attacking or competing tenant, nor are such results visible in unencrypted form to the cloud service provider.

In step 212, the encrypted results are stored in a virtual memory of the storage resources 108. The virtual memory may comprise, for example, a particular virtual disk of the storage resources 108 that is allocated to the requesting tenant.

Again, as the results are stored and transmitted in encrypted form in respective steps 210 and 212, there is no visibility to attacking or competing tenants. Moreover, as indicated above, the encryption performed in step 208 ensures that the encrypted results are not even accessible to the cloud service provider, as the cloud service provider is unable to determine the private key of the tenant. The encrypted results remain entirely secure when stored on a virtual disk of the storage resources 108 and also when in transit on the wire to a tenant device.

The present embodiment therefore provides enhanced security for tenant data when such data is being processed, stored or transmitted by cloud infrastructure 102, against attacking or competing tenants that share the multi-tenant resources 106 as well as against the cloud service provider itself. This removes a significant barrier to more widespread adoption of cloud services. More particularly, under conventional practice, a lack of trust between tenants sharing cloud infrasuscture as well between tenants and the cloud service provider has led to a concern that sensitive tenant data may not be adequately protected when processed, stored or transmitted by the cloud infrastructure. Such security concerns are considerably alleviated by the exemplary techniques disclosed herein, which in illustrative embodiments ensure that only the tenant requesting a given processing job will be able to access tenant data resulting from performance of that job.

Figure 2:
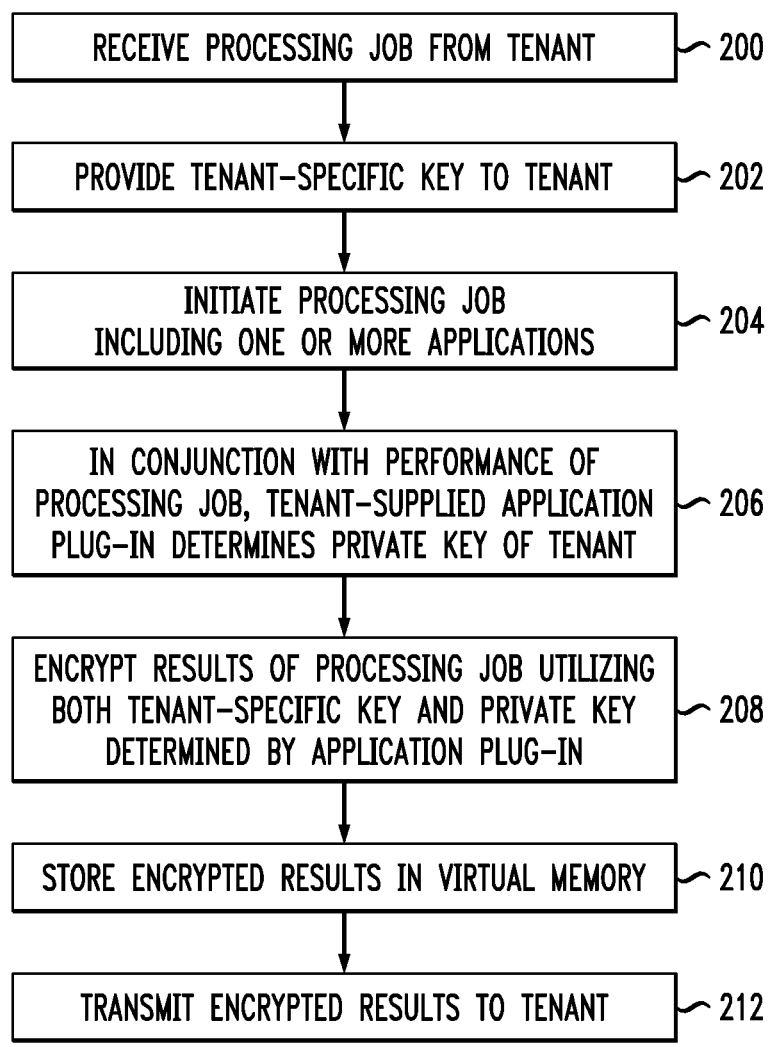
FIG. 2 is a flow diagram of a process for providing security for multiple tenants of cloud infrastructure in the system of FIG. 1.

The process as illustrated in FIG. 2 may be repeated serially for each of a plurality of processing jobs of the requesting tenant, or multiple instances of the process may be performed at least in part in parallel for multiple processing jobs of the tenant. Also, similar processes can be performed on behalf of other tenants that utilize the multi-tenant resources 106 of the cloud infrastructure 102.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing tenant security in system 100. For example, the ordering of the process steps may be varied in other embodiments, or certain steps may be performed concurrently with one another rather than serially. Also, as indicated above, one or more of the process steps may be repeated periodically for a given tenant, or performed in parallel for multiple tenants.

It is to be appreciated that multi-tenant security functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

Figure 3:
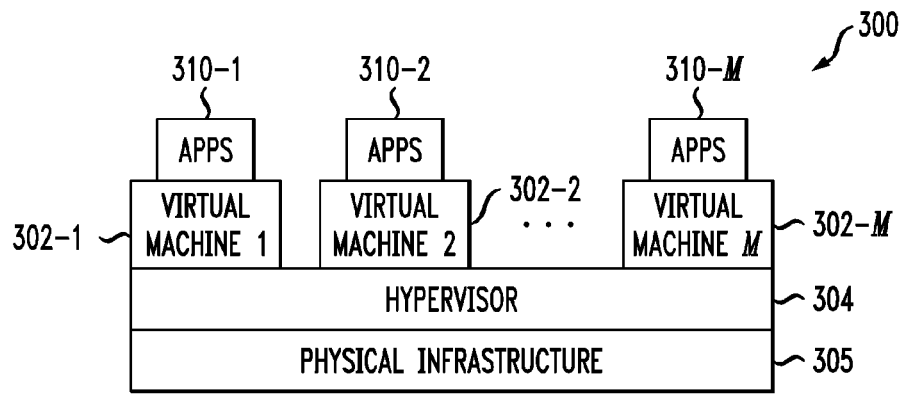
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the infrastructure 102. Thus, the tenant devices 104 may be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 102 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
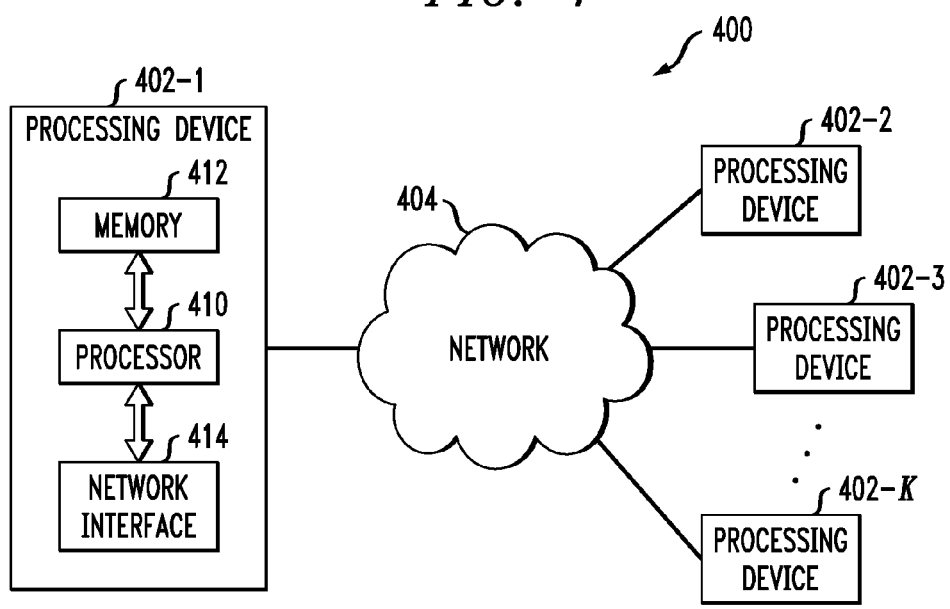

Multiple elements of information processing system 100 may be collectively implemented on a common processing platform of the type shown in FIG. 3 or 4, or each such element may be implemented on a separate processing platform.

Figure 5:
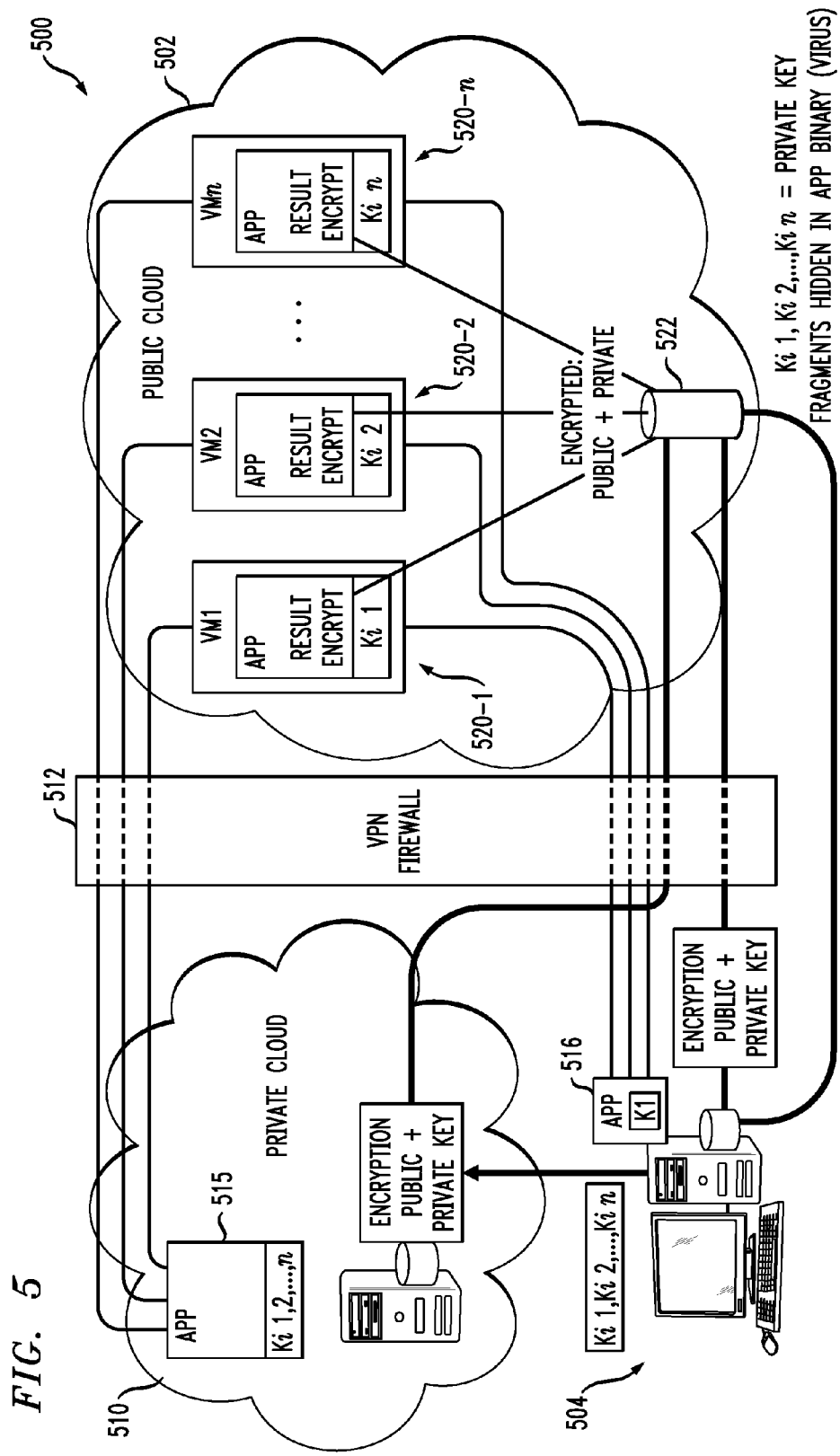
FIGS. 5 and 6 are diagrams showing security processes in other illustrative embodiments of the invention.
Figure 6:
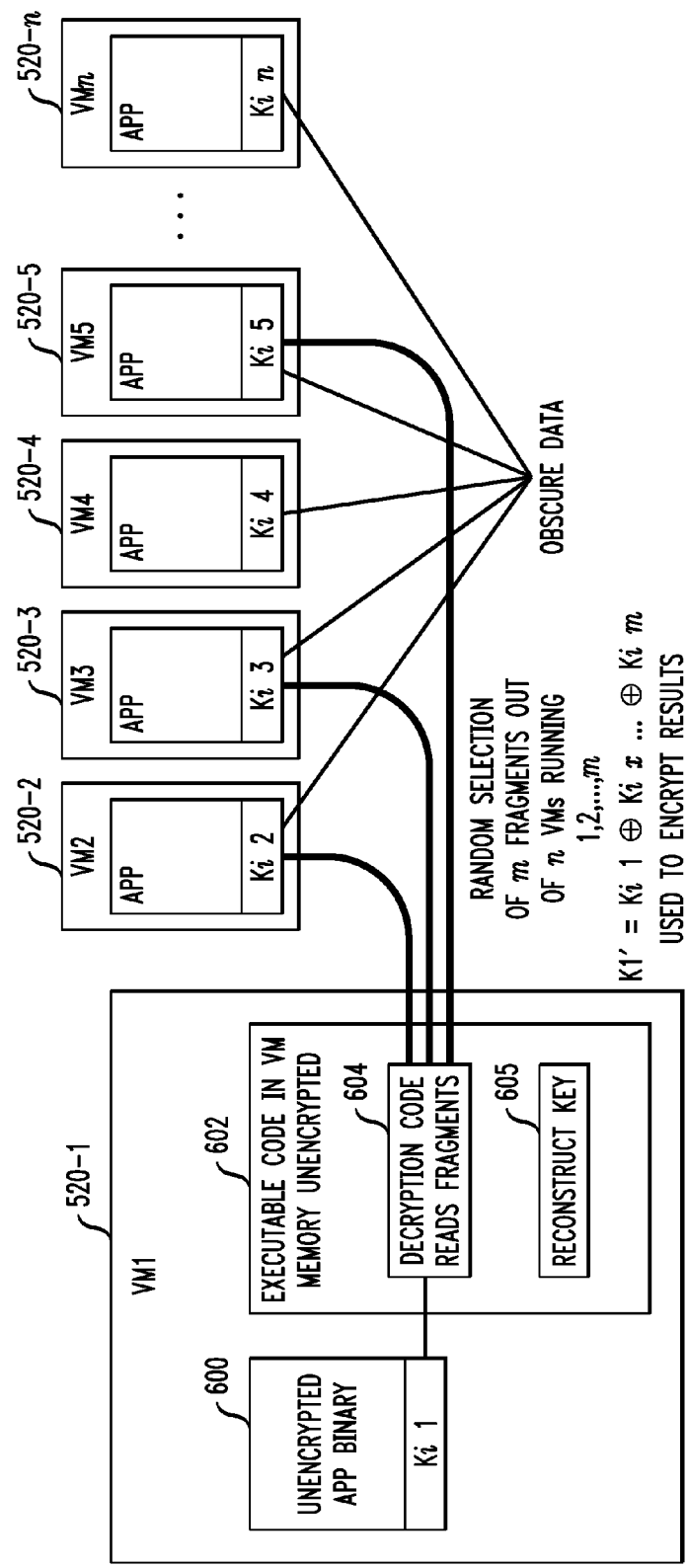

Referring now to FIGS. 5 and 6, additional illustrative embodiments of the present invention will be described.

In the FIG. 5 embodiment, an information processing system 500 comprises cloud infrastructure in the form of a public cloud 502. The system further includes a tenant device 504 that is associated with a private cloud 510. The tenant device 504 and the private cloud 510 are configured to communicate with the public cloud 502 via a virtual private network (VPN) firewall 512. The private cloud 510 includes an application 515 having an associated private key K1. The private key K1 is generated by a private key generator that is assumed to be associated with application 516 running on tenant device 504. The private key K1 comprises fragments Ki 1, Ki 2, ... Ki n, which are supplied by tenant device 504 to private cloud 510 for association with application 515.

This embodiment also makes use of a tenant-specific key in the form of a public key. The public key may be generated separately by both the tenant device 504 and the cloud service provider that implements public cloud 502. For example, it may be separately generated by each of these entities using a public certificate and a shared password. The resulting public key is specific to the tenant and is known by the tenant and the cloud service provider. In this embodiment, it is also assumed to be known by the private cloud 510, which can generate the public key itself or receive it from the tenant. Tenant data stored in the public cloud 502, transmitted between the public cloud 502 and the tenant device 504, or transmitted between the public cloud 502 and the private cloud 510, is encrypted using a combination of both the public key and the private key, as indicated in the figure.

The tenant device 504 requests performance of a processing job by public cloud 502. The processing job in this embodiment involves running n applications on respective virtual machines 520-1 through 520-$n$ of the public cloud 502. The virtual machines are also denoted as VM1 through VMn. Results of the processing job are encrypted by their corresponding applications and stored in a virtual memory 522. The various fragments Ki 1, Ki 2, ... Ki n of the private key K1 are hidden in the respective applications, for example, using virus-like association of each fragment with a binary file of its corresponding application. In order to encrypt its results, a given one of the virtual machines 520 utilizes a key reconstruction module to reconstruct a version K1' of the original private key K1, and then utilizes the reconstructed private key to encrypt the results.

An example of the key reconstruction process is illustrated in greater detail in FIG. 6, which shows the manner in which one of the virtual machines, namely VM1 in the present example, reconstructs the private key. As indicated previously, the fragments Ki 1, Ki 2, ... Ki n of the private key K1 are hidden as obscure data in the respective applications running on virtual machines VM1 through VMn, by virus-like association with corresponding binary files or using other data concealment techniques known to those skilled in the art. An application 600 running on virtual machine VM1 has an associated application plug-in 602 that includes executable code residing in a memory of the virtual machine. This executable code includes decryption code 604 that reads fragments of the private key from selected ones of the other applications, and key reconstruction code 605 that reconstructs the private key from the selected fragments as well as its own fragment.

Thus, the application plug-in 602 determines the private key in the present embodiment by obtaining selected fragments of the private key from respective ones of the other applications and combining its own fragment Ki 1 of the private key with the selected fragments obtained from the respective ones of the other applications so as to thereby generate reconstructed private key K1'. This more particularly involves, in the present embodiment, randomly selecting just m fragments from respective ones of the applications, where m is less than or equal to n, and combining fragment Ki 1 with the randomly selected m fragments using an exclusive-or operation, as indicated in the figure. Thus, the private key is reconstructed in this example from the randomly selected m fragments, which in the figure includes a random fragment identified as Ki x, as well as fragment Ki 1. This resulting reconstructed private key is then utilized by VM1 to reconstruct the results generated by application 600.

Each of the other virtual machines VM2 through VMn can reconstruct the private key in a similar manner, and use its own reconstructed private key to encrypt its results. In other embodiments, alternative techniques can be used to reconstruct the private key from its fragments. For example, each application can reconstruct the private key from all of its n fragments, rather than from a subset of m of the n fragments. As another example, the entire private key can be associated with each of a plurality of applications in other embodiments.

The individual encrypted results from the various applications are further encrypted using the public key specific to the requesting tenant before those results are stored in the virtual memory 522 or transmitted back to the tenant device 504 or its associated private cloud 510. This is one example of the manner in which results of a processing job are encrypted using a combination of a tenant-specific key from a cloud service provider and a private key of the tenant, although numerous other types of combinations may be used, including performing a single encryption operation using a key that is formed as a combination of the two above-noted keys. Thus, the term "combination" in this context is intended to be broadly construed, and does not require that the two keys be combined into a single key, but instead is intended to cover numerous other arrangements in which both keys are utilized in some manner to perform the encryption of the results, so as to provide security for the results not only from other tenants but also from the cloud service provider.

It should again be emphasized that the above-described embodiments of the invention are presented for purposes of illustration only. Many variations and other alternative embodiments may be used. For example, the techniques are applicable to a wide variety of other types of devices and systems that can benefit from secure multi-tenancy techniques disclosed herein. Also, the particular configuration of system and device elements shown in FIGS. 1 and 3-6, and the security process shown in FIG. 2, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed in cloud infrastructure of an information processing system, the method comprising the steps of:
   receiving a processing job from a tenant;
   obtaining a first key specific to the tenant;
   determining a second key utilizing information supplied by the tenant; and
   encrypting one or more results of the processing job utilizing a combination of the first key and the second key;
   wherein at least a portion of the second key is determined by at least one application that is run on at least one virtual machine of the cloud infrastructure in conjunction with performance of the processing job; and
   wherein the second key is at least partially hidden within said at least one application.

2. The method of claim 1 wherein said steps are performed by at least one processing device having a processor coupled to a memory.

3. The method of claim 1 further comprising the step of storing the encrypted results of the processing job in a virtual memory of the cloud infrastructure.

4. The method of claim 1 further comprising the step of transmitting the encrypted results of the processing job to the tenant.

5. The method of claim 1 wherein the first key comprises a tenant-specific key generated by a cloud service provider and provided by the cloud service provider to the tenant.

6. The method of claim 1 wherein the second key comprises a private key of the tenant.

7. The method of claim 1 wherein the second key is at least partially hidden within said at least one application by virus-like association of at least a portion of said second key with a binary file of said application.

8. The method of claim 1 wherein the processing job comprises running a plurality of applications on respective virtual machines of the cloud infrastructure.

9. A method performed in cloud infrastructure of an information processing system, the method comprising the steps of:
   receiving a processing job from a tenant;
   obtaining a first key specific to the tenant;
   determining a second key utilizing information supplied by the tenant; and
   encrypting one or more results of the processing job utilizing a combination of the first key and the second key;
   wherein at least a portion of the second key is determined by at least one application that is run on at least one virtual machine of the cloud infrastructure in conjunction with performance of the processing job;
   wherein the processing job comprises running a plurality of applications on respective virtual machines of the cloud infrastructure; and
   wherein portions of the second key are hidden in respective ones of the applications.

10. The method of claim 9 wherein a given one of the applications determines the second key by obtaining selected fragments of the second key from respective ones of the other applications and combining its own fragment of the second key with the selected fragments obtained from the respective ones of the other applications so as to thereby reconstruct the second key.

11. The method of claim 10 wherein the selected fragments comprise m fragments randomly selected from respective ones of the applications, where m is less than or equal to n, and where n denotes the total number of applications of the processing job running on respective virtual machines of the cloud infrastructure.

12. A method performed in cloud infrastructure of an information processing system, the method comprising the steps of:
   receiving a processing job from a tenant;
   obtaining a first key specific to the tenant;
   determining a second key utilizing information supplied by the tenant; and
   encrypting one or more results of the processing job utilizing a combination of the first key and the second key;
   wherein at least a portion of the second key is determined by at least one application that is run on at least one virtual machine of the cloud infrastructure in conjunction with performance of the processing job; and
   wherein the application determines the second key utilizing an application plug-in that is provided by the tenant to the cloud infrastructure in encrypted form using the first key.

13. A computer program product comprising a non-transitory processor-readable storage medium having encoded therein executable code of one or more software programs, wherein the one or more software programs when executed cause the cloud infrastructure to perform the steps of the method of claim 1.

14. An apparatus comprising:
cloud infrastructure comprising one or more processing devices implementing a plurality of virtual machines, a given such processing device comprising a processor coupled to a memory;
the cloud infrastructure being configured to receive a processing job from a tenant, to obtain a first key specific to the tenant, to determine a second key utilizing information supplied by the tenant, and to encrypt one or more results of the processing job utilizing a combination of the first key and the second key;
wherein at least a portion of the second key is determined by at least one application that is run on at least one of the virtual machines of the cloud infrastructure in conjunction with performance of the processing job; and
wherein the second key is at least partially hidden within said at least one application.

15. The apparatus of claim 14 wherein the second key is at least partially hidden within said at least one application by virus-like association of at least a portion of said second key with a binary file of said application.

16. An apparatus comprising:
cloud infrastructure comprising one or more processing devices implementing a plurality of virtual machines, a given such processing device comprising a processor coupled to a memory;
the cloud infrastructure being configured to receive a processing job from a tenant, to obtain a first key specific to the tenant, to determine a second key utilizing information supplied by the tenant, and to encrypt one or more results of the processing job utilizing a combination of the first key and the second key;
wherein at least a portion of the second key is determined by at least one application that is run on at least one of the virtual machines of the cloud infrastructure in conjunction with performance of the processing job; and
wherein the processing job comprises running a plurality of applications on respective virtual machines of the cloud infrastructure, and wherein portions of the second key are hidden in respective ones of the applications.

17. The apparatus of claim 16 wherein a given one of the applications determines the second key by obtaining selected fragments of the second key from respective ones of the other applications and combining its own fragment of the second key with the selected fragments obtained from the respective ones of the other applications so as to thereby reconstruct the second key.

18. An apparatus comprising:
cloud infrastructure comprising one or more processing devices implementing a plurality of virtual machines, a given such processing device comprising a processor coupled to a memory;
the cloud infrastructure being configured to receive a processing job from a tenant, to obtain a first key specific to the tenant, to determine a second key utilizing information supplied by the tenant, and to encrypt one or more results of the processing job utilizing a combination of the first key and the second key;
wherein at least a portion of the second key is determined by at least one application that is run on at least one of the virtual machines of the cloud infrastructure in conjunction with performance of the processing job; and
wherein the application determines the second key utilizing an application plug-in that is provided by the tenant to the cloud infrastructure in encrypted form using the first key.

19. An information processing system comprising at least one processing platform which incorporates the apparatus of claim 14.

20. The method of claim 12 wherein the first key comprises a tenant-specific key generated by a cloud service provider and provided by the cloud service provider to the tenant.

21. The method of claim 12 wherein the second key comprises a private key of the tenant.

\* \* \* \* \*